US007187389B2

(12) United States Patent
Redpath et al.

(10) Patent No.: US 7,187,389 B2
(45) Date of Patent: Mar. 6, 2007

(54) SYSTEM AND METHOD FOR SIMULTANEOUS DISPLAY OF MULTIPLE OBJECT CATEGORIES

(75) Inventors: Sarah D. Redpath, Cary, NC (US); Randy A. Rendahl, Durham, NC (US); Robert T. Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 09/833,418

(22) Filed: Apr. 12, 2001

(65) Prior Publication Data

US 2002/0149602 A1 Oct. 17, 2002

(51) Int. Cl.
*G09G 5/02* (2006.01)

(52) U.S. Cl. .................. 345/619; 345/629; 345/581
(58) Field of Classification Search ........... 345/619, 345/581, 606, 736, 853, 738, 739, 740, 854, 345/419, 629; 382/303
See application file for complete search history.

(56) References Cited

U.S. PATENT DOCUMENTS

| 5,317,689 | A |   | 5/1994  | Nack et al. .................. 345/505 |
| 5,500,934 | A | * | 3/1996  | Austin et al. ................. 715/853 |
| 5,553,211 | A | * | 9/1996  | Uotani ......................... 345/641 |
| 5,831,618 | A |   | 11/1998 | Fuji et al. |
| 5,831,631 | A |   | 11/1998 | Light et al. .................. 345/440 |
| 5,907,704 | A |   | 5/1999  | Gudmundson et al. ......... 707/1 |
| 5,913,205 | A |   | 6/1999  | Jain et al. ........................ 707/2 |
| 5,926,177 | A | * | 7/1999  | Hatanaka et al. ............ 345/747 |
| 5,958,012 | A |   | 9/1999  | Battat et al. ................. 709/224 |
| 5,973,693 | A |   | 10/1999 | Light ............................ 345/348 |
| 6,005,578 | A | * | 12/1999 | Cole ............................ 345/854 |
| 6,031,537 | A |   | 2/2000  | Hugh ........................... 345/357 |
| 6,061,515 | A |   | 5/2000  | Chang et al. ................ 707/100 |
| 6,078,739 | A | * | 6/2000  | Paterson et al. ................ 703/6 |
| 6,091,893 | A |   | 7/2000  | Fintel et al. ............ 395/500.27 |
| 6,115,743 | A | * | 9/2000  | Cowan et al. ............... 709/224 |
| 6,144,962 | A |   | 11/2000 | Weinberg et al. ............... 703/6 |

(Continued)

FOREIGN PATENT DOCUMENTS

WO        9913420        3/1999

OTHER PUBLICATIONS

Mastering Windows 3.1 Special Edition, 1992, SYBEX Inc. pp. 104-144.*

(Continued)

*Primary Examiner*—Kee M. Tung
*Assistant Examiner*—J. Amini
(74) *Attorney, Agent, or Firm*—Van Leeuwen & Van Leeuwen; Gerald R. Woods

(57) ABSTRACT

A system and method for displaying objects in a plurality of layers. The layers are distinguished from one another using a variety of display attributes in order to emphasize objects in upper layers and de-emphasize objects in lower layers. The display attributes may include use of color (hue, saturation, and value), three dimensional images, fill patterns, and other display techniques. The user is able to change the layering in order to emphasize a different group, or category, of objects and de-emphasize other groups. The layers can be predefined, for example a hardware and software layers, or may be defined by analyzing the attributes corresponding with the objects. Objects and their attributes are stored in a data store, such as a relational database. Predefined layers include one or more of these attributes to use for matching.

18 Claims, 6 Drawing Sheets

U.S. PATENT DOCUMENTS

| | | | | |
|---|---|---|---|---|
| 6,237,006 | B1* | 5/2001 | Weinberg et al. | 707/103 R |
| 6,476,821 | B2* | 11/2002 | Sawada et al. | 345/620 |
| 6,578,076 | B1* | 6/2003 | Putzolu | 709/223 |
| 6,690,397 | B1* | 2/2004 | Daignault, Jr. | 715/764 |
| 6,885,677 | B1* | 4/2005 | Klevans | 370/466 |
| 2001/0008401 | A1* | 7/2001 | Schunicht | 345/619 |
| 2002/0030703 | A1* | 3/2002 | Robertson et al. | 345/853 |
| 2002/0113816 | A1* | 8/2002 | Mitchell et al. | 345/734 |
| 2003/0033402 | A1* | 2/2003 | Battat et al. | 709/224 |

OTHER PUBLICATIONS

Hao-wei Hsieh and Frank M. Shipman III; A Visual interface supporting the direct Manipulation of structured data using two-way mappings 2000, pp. 141-148.*

Demonstrations (video): physical and shared spaces: Tivoli: integrating structured domain objects into a freeform whiteboard environment Thomas P. Moran, William van Melle Apr. 2000 CHI '00 extended abstracts on Human factors in computing systems.*

Web-accessible network management tools Nathan J. Muller Sep. 1997 International Journal of Network Management, vol. 7 Issue 5.*

Tivoli NetView 5.1 for Unix for implementers; student's training Guide Jun. 1999, pp. 6-11 thru 6-25.*

Mastering Windows 3.1 special edition, 3 pages.*

Kosak C. et al: "Automating the Layout of Network Diagrams with Specified Visual Organization" IEEE Transactions on Systems, Man and Visual Cybernetics, IEEE Inc. New York, US, vol. 24, No. 3, Mar. 1, 2004 pp. 440-454.

* cited by examiner

SYSTEM AND METHOD FOR SIMULTANEOUS DISPLAY OF MULTIPLE OBJECT CATEGORIES

BACKGROUND OF THE INVENTION

1. Technical Field

The present invention relates in general to a method and system for using color and highlighting to display a tree view display. More particularly, the present invention relates to a system and method for providing a non-indented, layered representation of tree view data.

2. Description of the Related Art

One of the highest priorities of information technology (IT) organizations responsible with managing mission-critical computing environments is understanding the various components, or objects, that comprise the business system. With increased computer power and advanced networking equipment and tools, even small businesses often have complex business systems. Managing and understanding these increasingly complex systems is an increasingly challenging task.

As used herein, a "business system" serves the needs of the organization's business functions, such as order entry, marketing, accounts receivable, and the like. A business system may span several dissimilar types of computers and be distributed throughout many geographical locations. A business system, in turn, is typically based upon several application programs. An application program may also span several dissimilar types of computers and be distributed throughout a network of computer systems.

An application typically serves a particular function that is needed by the business system. An individual application program may, or may not, be critical to the business system depending upon the role the application program plays within the overall business system. Using networked computers, an application may span several computer systems. In an Internet commerce system, for example, an application program that is part of the company's order processing business system, may be responsible for serving web pages to users browsing the companies online catalog. This application may use several computer systems in various locations to better serve the customers and provide faster response to customer inquiries.

The application may use some computers running one type of operating system, for example a UNIX-based operating system such as IBM's AIX® operating system, while other computer systems may run another type of server operating system such as Microsoft's Windows NT® Server operating system. Individual computer systems work together to provide the processing power needed to run the business systems and application programs. These computer systems may be mainframes, mid-range systems, workstations, personal computers, or any other type of computer that includes at least one processor and can be programmed to provide processing power to the business systems and applications. Applications also manage an organizations data, stored in databases that may be organized in various fashions. Some database files, such as a customer file, may be used by several applications, while other database files are only used by a single application.

Computer systems, in turn, include individual resources that provide various functionality to the computer systems. For example, a modem is an individual resource that allows a computer system to link to another computer system through an communication network. A router is another individual resource that routes electronic messages between computer systems.

Computers are often linked to one another using a network, such as a local area network (LAN), wide area network (WAN), or other types of networks such as the Internet. By linking computers, one computer can use resources owned by another computer system. These resources can include files stored on nonvolatile storage devices and resources such as printers. Smaller computers used by an individual (client computers) are often linked to more powerful computers, called servers, that provide large file systems, larger processing capabilities, and resources not typically found on client computers. Servers may be larger PCs, workstations, or mainframe computer systems.

Applications, database, computers, and networks are all examples of categories, or groups, of objects used by an organization. Because of the interrelationships between objects, the number of different categories of objects, and the vast number of objects in most organizations, mapping and understanding the business system is a difficult challenge to address. Indeed, any system that has large numbers of objects in many categories with relationships is difficult to conceptually understand using tools available today.

What is needed, therefore, is a way of visually presenting complex information by grouping objects into layers and providing different display attributes to aid the user in distinguishing between the various displayed layers.

SUMMARY

It has been discovered that objects can be grouped into layers and the individual layers can be displayed using display attributes that identifies a particular layer. The layers can be manipulated by the user in order to have a certain group of objects displayed in a particular layer.

For example, a business system can be broken down into a hardware category and a software category. The user can select which of these categories is displayed in the uppermost, or first, layer and which is displayed in a lower, or second, layer. The objects in the uppermost layer are visually emphasized using a variety of techniques. For example, the uppermost objects may be rendered as 3-dimensional objects, may be larger, and may be colored in a highly saturated manner. Lower level objects are distinguished by altering one or more of the display attributes. For example, a second layer may be displayed in a 2-dimensional, or flat, fashion, and be smaller in proportion to the objects displayed in the first layer.

Relationships between objects can be shown as lines between objects and relationships may span layers. In addition, objects within a particular layer can be visually distinguished to show their dissimilarity with respect to one or more attributes while still maintaining their grouping in the same layer. For example, graphics representing computer systems may all be in the same layer, yet may be colored differently to indicate that certain computers are more powerful than other computers. In order to retrieve information about a particular object, the user can select the object using a mouse or pointing device and details concerning the object are displayed for the user to review and/or edit. The user can re-layer the categories so that the category of objects displayed in one layer are moved to another layer. For example, one view can display the category of hardware objects in a first, or most emphasized, layer and a display the category of software objects in a second, less emphasized, layer. By selecting and moving the software category above the hardware category (or by moving the hardware category beneath the software category) the category of software objects is redisplayed in the first most emphasized layer and the category of hardware objects is displayed in the second, less emphasized layer.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
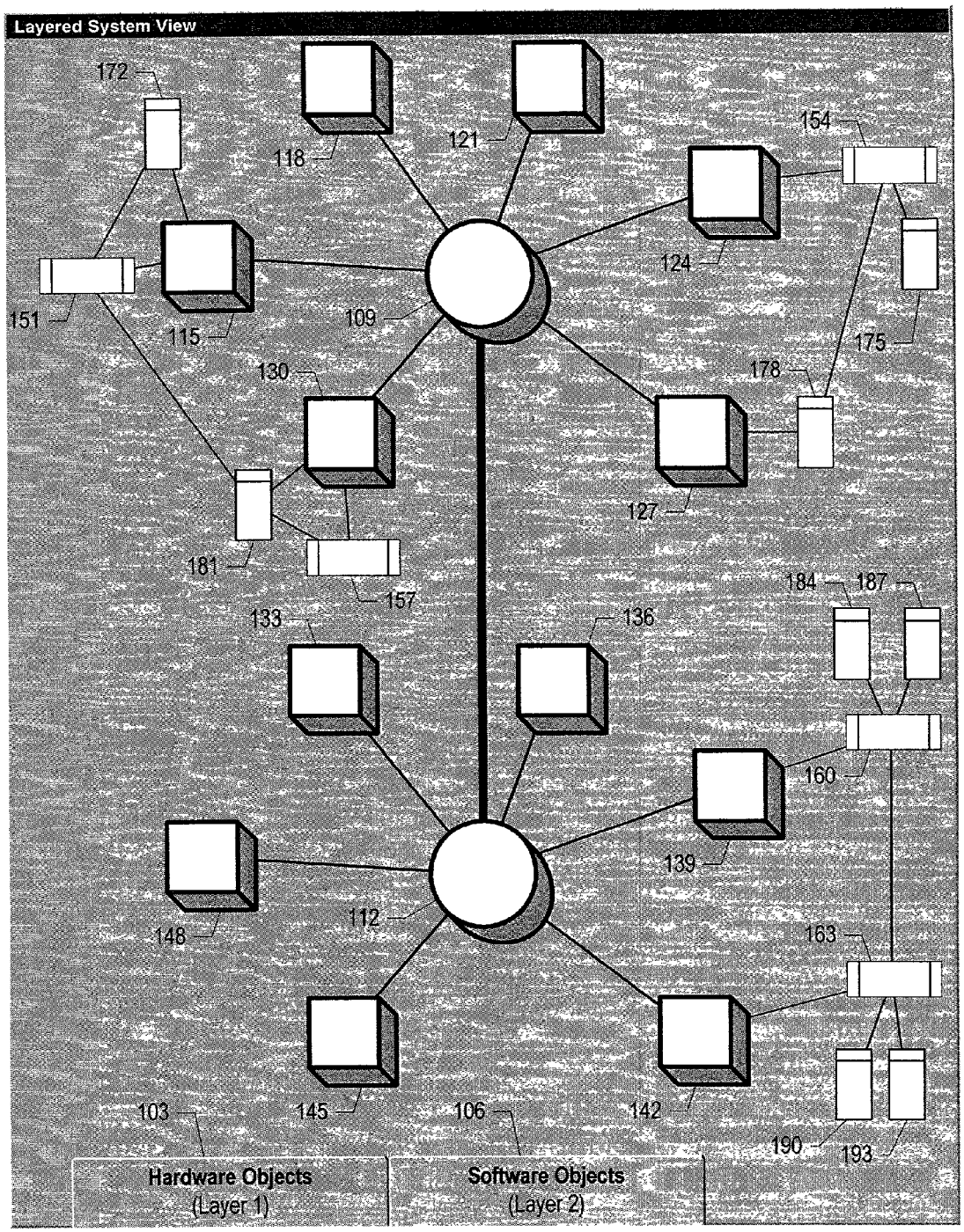
FIG. 1 is an example of a layered system view showing hardware components on the first layer and software components on the second layer.

FIG. 1 shows an example of a layered system view showing hardware components on the first layer and software components on the second layer. System display 100 contains a number of components, or objects, that help describe a business or application system. A system may contain a number of objects that relate to one another. Some of these objects have similar attributes, while other objects may have different attributes but are related in some fashion. Objects are grouped into categories in order to aid the user in viewing and understanding the information that is displayed. For example, categories may include application software, middleware software, network resources, and hardware components. These categories, in turn, can be broken into smaller subcategories depending upon the type of information needed by the user. For example, application software can be divided into database files and application programs.

The example shown in FIG. 1 is of a simple computer system that includes computers networked together and shared software applications residing on some of the computers. The system shown has been divided into two basic categories—a hardware category and a software category. Objects in the hardware category are displayed in one layer while objects in the software category are displayed in another layer. It will be appreciated by those skilled in the art that real world depictions of business systems may be much more complex with a multitude of categories, layers, and hundreds, if not thousands, of objects, while the example shown in FIG. 1 is more simple in order to describe the layering approach and provide increased clarity. In addition, system display 100 is capable of displaying objects in a variety of colors as well providing animation features not captured in a paper based drawing.

In system display 100, the user can select which category is displayed in the first layer or the second layer by selecting tab 103 or tab 106 and moving the tab to the position desired. For example, if the user selects tab 103 and moves it to the right of tab 106, then the hardware category would be displayed in layer 2 and the software category would be displayed in layer 1 (see FIG. 2 for an example). Items shown in layer 1 are emphasized using display characteristics to distinguish the items from those in layer 2. In FIG. 1, items in layer 1 are larger and shown in a three dimensional fashion, while items in layer 2 are smaller and shown in a two dimensional fashion making them look "flat" in comparison to those object in layer 1.

In the example, two network hubs (109 and 112) connected to each other. Each of the hubs has several computers attached. Hub 109 is shown connected to computers 115, 118, 121, 124, 127, and 130, while hub 112 is shown connected to computers 133, 136, 139, 142, 145, and 148. Some of the computers are shown with business applications running off of the computer. Computer 115 is used for application 151, computer 124 is used for application 154, computer 130 is used for application 157, computer 139 is used for application 160, and computer 142 is used for application 163. In addition, various databases, or data stores, are used by the applications. These data stores are also stored on a computer system. Data store 172 is used by application 151 and stored in computer 115, data store 175 is used by application 154 and stored on computer 124, data store 178 is used by application 154 and stored on computer 127, and data store 181 is stored on computer 130 and used by both applications 151 and 157. Data stores 184 and 187 are used by application 160 and stored on computer 139, and data stores 190 and 193 are used by application 163 and stored on computer 142. In FIG. 1, layer 1 includes the hubs and the computers and layer 2 includes the applications and the data stores. Objects that are related to one another have a relationship line indicating the relationship. In an upper level, such as level 1, the relationship lines may be thicker, colored differently, or shown using three dimensional display attributes so that the lines look more like pipes or tunnels. As used herein, "color" includes three variables that may be altered to emphasize or de-emphasize a given object—"hue," "saturation," and "value." Hue is the color in general, such as blue, red, yellow, etc. Saturation is the percentage of hue in the colored object. For example, a gray blue would have a lower saturation than a brilliant blue. Finally, value is the amount of white or black in the colored object, often described as the "lightness" or "darkness" of an object. Manipulating one or more of the three variables that comprise color aids in emphasizing or de-emphasizing the object, thus aiding in distinguishing objects in one layer from those in another.

In addition, other visual attributes can be used to distinguish objects in one layer from those in another. The degree to which an object is opaque or transparent, the proximity (closeness) of objects to one another, shape of objects, anomalous versus common (i.e., one black object appears more visually emphasized than six black objects.

Additionally, the objects shown within a particular layer can use visual techniques to distinguish additional characteristics. For example, the computers shown in FIG. 1 could be colored with various shades of red. Lighter red colored computers could indicate computers with less power while computers with more power could be colored more deeply red. In this manner, application loads may be shifted based on the power of the computer being used to host the application.

While the example shown in FIG. 1 is that of a computer system, anything with categories of objects with attributes could be shown using the layered approach. For example, the layered view could be used to display categories of problems that have been reported in a problem tracking system. The first layer could default to the most important problems. A second view of the problem data could show the organizations, or departments, handling errors in the first layer and the problems related to the department in a second layer. In addition, while object size and three dimensional display is used to distinguish between the objects in the layers shown in FIG. 1, other display attributes, particularly color and color saturation, can be used to depict object attributes. In a system where spatial relationships with other layers is important, such as a diagram of the human body, color (hue) can be used to distinguish one layer from another. Layers can then be emphasized by highly saturating the uppermost layers shown and lower layers would be dimmer or duller in appearance. Depending on what categories are of interest would determine layers are emphasized. For example, to view the circulatory system as an upper layer, the red used to show the circulation system would be deeply saturated, while colors used to show the respiratory and digestive systems would be dimmed or dulled. Choosing a different layering order to show the digestive system would cause the circulatory system to be dimmed or dulled and the hue used to depict the digestive system to be highly saturated.

Figure 2:
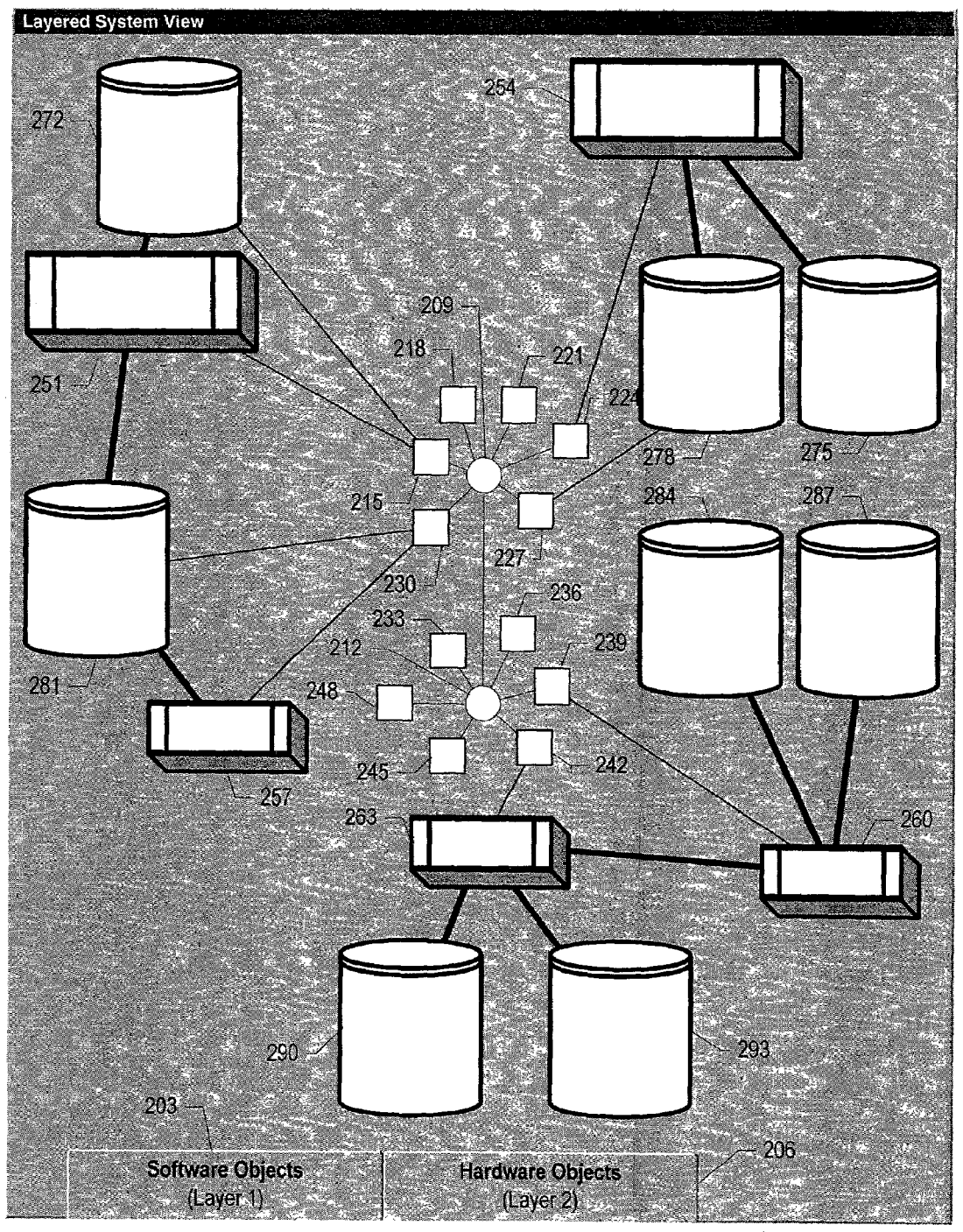
FIG. 2 is an example of a layered system view showing software components on the first layer and hardware components on the second layer.

FIG. 2 shows an example of a layered system view showing software components on the first layer and hardware components on the second layer within display window 200. The reference numerals used in FIG. 2 correspond to identify objects in FIG. 1. For example, hub 109 in FIG. 1 corresponds to hub 209 in FIG. 2, computer system 115 in FIG. 1 corresponds to computer system 215 in FIG. 2, application 151 corresponds to application 251, data store 172 in FIG. 1 corresponds to data store 272 in FIG. 2, etc.

While each of the objects shown in FIG. 1 is also shown in FIG. 2, the layering used in FIG. 2 shows the software category objects in layer 1 and the hardware category objects in layer 2. Therefore, the applications (251, 254, 257, 260, and 263) and data stores (272, 275, 278, 281, 284, 287, 290, and 293) are shown larger and in a three dimensional fashion, while the network hubs (209 and 212) and computers (215, 218, 221, 224, 227, 230, 233, 236, 239, 242, 245, and 248) are shown smaller and in a two dimensional, or flat, fashion. FIG. 2, consequently emphasizes or highlights the software components and de-emphasizes the hardware components. A user might use layer display window 200 to analyze the software components. In addition, the user may wish to click on a displayed object to view or change attributes corresponding to the object. Tabs 203 and 206 show the layers being displayed. To change the layers back to those shown in display window 100 (see FIG. 1), the user would select one of the tabs and move it to the position desired.

Other attributes could be shown for objects shown in FIG. 2. For example, the application objects could be colored to indicate they type of application and the data stores could be colored to indicate the size of the data store.

The objects shown in FIGS. 1 and 2 are distinguishable from one another due to display attributes that are not based on the space used to display the objects. In other words, the various layers of objects are displayed using non-spatially distinguishable display attribute, such as color hues, color values, color saturation, size, three dimensional images, animation, shading, fill patterns, line patterns, line weights, opaqueness, transparency, shape, and object anomaly.

Figure 3:
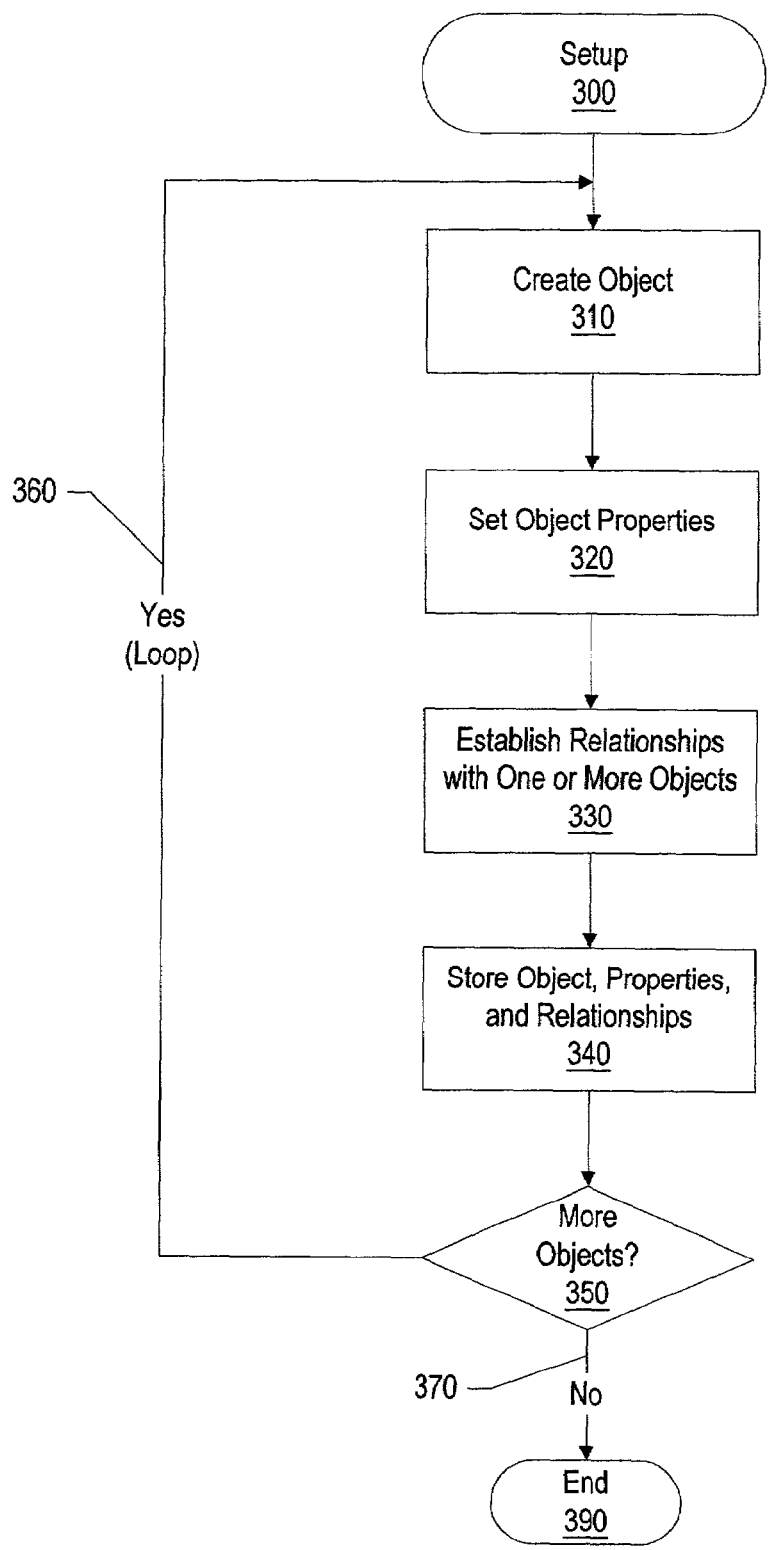
FIG. 3 is a flowchart for creating objects with properties and relationships that are used in layered views.

FIG. 3 shows a flowchart for creating objects with properties and relationships that are used in layered views. Processing commences at setup step 300 whereupon an object is created (step 310). The object has one or more properties, for example the type of object, its size, location, capacity, and the like. Some of these properties may be dynamic, such as the object's current capacity, while another property, such as the object's type, may be static. These properties are set in step 320.

An object may have one or more relationships with other objects. These relationships are established in step 330. Relationships may be between objects within the same category or between objects in different categories. Related objects in different categories may be in the same layer as the object or may be in different layers altogether. Relationships may be intrinsically set within an object—for example an application may read from a particular data store. Other relationships, such as which computer system hosts a particular application, may be provided by the user or derived when analyzing the relationships within a particular computer.

The object and its properties and relationships are stored (step 340) in a manner so that the attributes are easily retrievable when gathering information to set up the various display layers. One storage mechanism that may be used is a relational database. In a relational database, a category of objects may be stored in a database table and database fields within the table used to store attributes pertaining to the object. Each object can include a unique identifier so that relationships between objects can be stored using the objects' identifiers.

A determination is made as to whether more objects will be created (decision 350). If more objects are desired, "yes" branch 360 is taken by decision 350 looping back to process the next object. When no more objects need to be created, decision 350 branches to "no" branch 370 and processing ends at 390.

Figure 4:
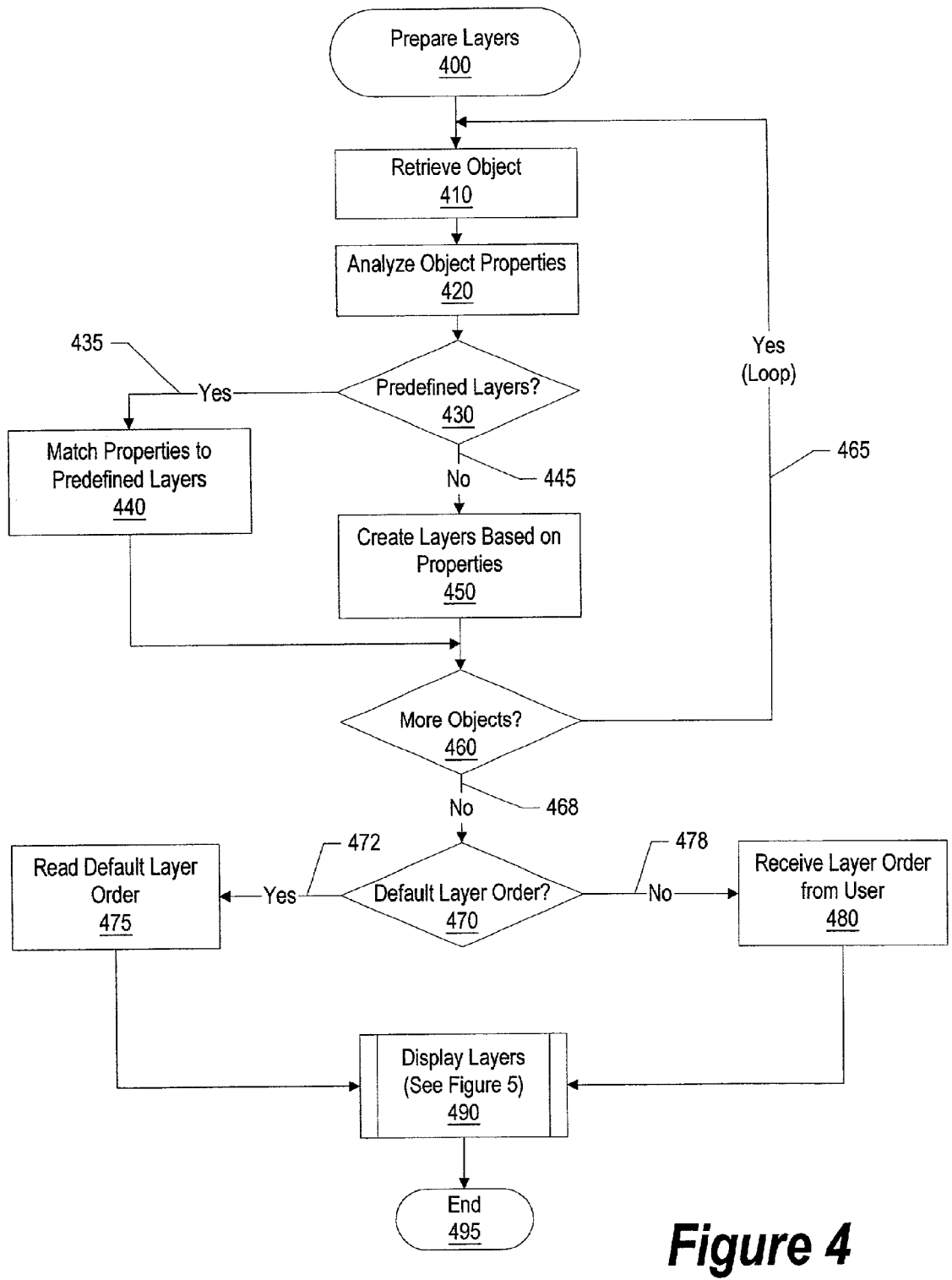
FIG. 4 is a flowchart for preparing layers based upon object properties and relationships.

FIG. 4 shows a flowchart for preparing layers based upon object properties and relationships. The system retrieves the first object (step 410) from a memory area or data store, such as the relational database described in FIG. 3. The properties associated with the retrieved object are analyzed (step 420). A determination is made as to whether there are predefined layers that establish the objects placement in a particular layer (decision 430). If there are predefined layers established, decision 430 branches to "yes" branch 435 and the object's properties are matched against the predefined layer attributes to determine which layer to assign to the object (step 440). If there are not predefined layers, decision 430 branches to "no" branch 445 and a layer is dynamically created and assigned to the object (step 450). For example, in the example shown in FIGS. 1 and 2, the object type (hardware or software) may be used as the layering attribute. The object properties could indicate which of the attributes better aggregate the objects based upon the position of the attribute (i.e., attributes in the first columns) or based upon another attribute corresponding to the objects.

A determination is made as to whether more objects need to be analyzed and placed into layers (decision 460). If more objects need to be analyzed and placed into layers, decision 460 branches to "yes" branch 465 which loops back to process the next object. When all the objects have been processed and placed into layers, decision 460 branches to "no" branch 468.

A determination is made as to whether a default, or starting, order exists for displaying the various layers (decision 470). If a default layer order does exist, decision 470 branches to "yes" branch 472 where the default layer order is read (step 475). On the other hand, if no default layer order exists, "no" branch 478 is taken and a layer order is received from the user (step 480). Additionally, if no default layer order is established, the layers can be randomly displayed and the user can manipulate the layer order to suit his or her needs.

Figure 5:
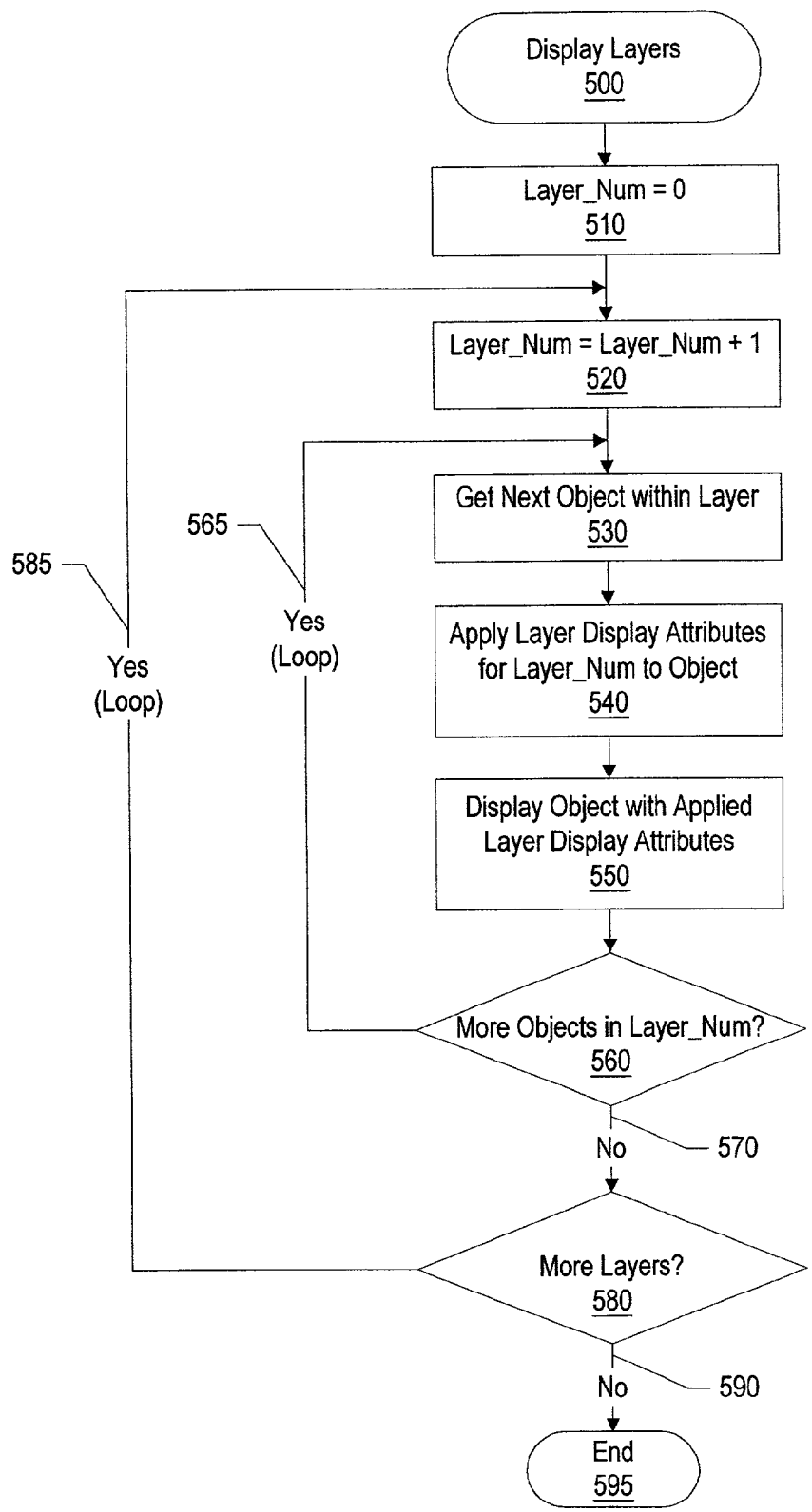
FIG. 5 is a flowchart for displaying objects within two or more layers.

Once the objects are assigned to layers and a layer order has been selected (either by default or by a user selection), the layered objects are displayed on the display screen (predefined process 490, see FIG. 5 for further details). Processing then ends at 495.

FIG. 5 shows a flowchart for displaying objects within two or more layers. The layer number is defined and initialized to zero (step 510). The layer number is then incremented prior to processing the first layer (step 520). The first object within the layer is retrieved (step 530). The display attributes for the first layer are applied to the object (step 540). In addition, display attributes may apply to other object attributes. For example, computers may be in the same layer but displayed with different color variables (hue, saturation, value) depending upon the processing power of the computer system. The object is displayed on the display screen with the applied display attributes (step 550). A determination is made as to whether there are more objects to display within the current display level (decision 560). If there are more objects to display within the current display level, decision 560 branches to "yes" branch 565 which loops back to retrieve and process the next object within the layer. On the other hand, if there are no more objects to display within the layer, decision 560 branches to "no" branch 570.

A determination is made as to whether there are more layers to display (decision 580). In some complex systems with many layers, decision 580 may be triggered (i.e. equal "true") before all the layers are processed so that only some of the possible layers are actually displayed. Additionally, the user may display the number of layers that are displayed to increase or decrease the total number of objects shown on the display at a given time. If there are more layers to display, decision 580 branches to "yes" branch 585 which loops back to increment the layer number and process the objects within the next layer. When there are no more layers to process, decision 580 branches to "no" branch 590 and processing ends at 590.

Figure 6:
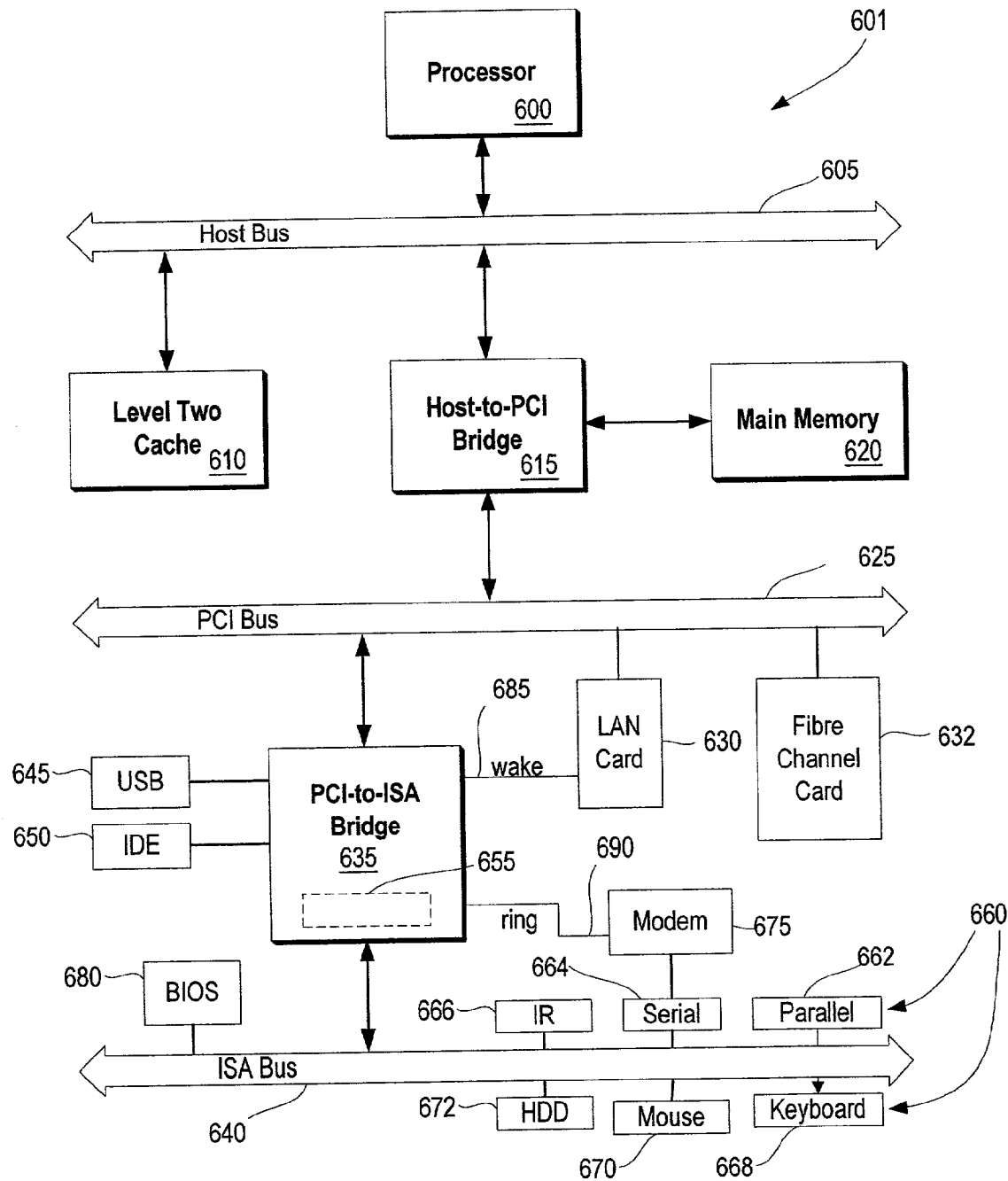
FIG. 6 is a block diagram of an information handling system capable of implementing the present invention.

FIG. 6 illustrates information handling system 601 which is a simplified example of a computer system capable of performing the server and client operations described herein. Computer system 601 includes processor 600 which is coupled to host bus 605. A level two (L2) cache memory 610 is also coupled to the host bus 605. Host-to-PCI bridge 615 is coupled to main memory 620, includes cache memory and main memory control functions, and provides bus control to handle transfers among PCI bus 625, processor 600, L2 cache 610, main memory 620, and host bus 605. PCI bus 625 provides an interface for a variety of devices including, for example, LAN card 630. PCI-to-ISA bridge 635 provides bus control to handle transfers between PCI bus 625 and ISA bus 640, universal serial bus (USB) functionality 645, IDE device functionality 650, power management functionality 655, and can include other functional elements not shown, such as a real-time clock (RTC), DMA control, interrupt support, and system management bus support. Peripheral devices and input/output (I/O) devices can be attached to various interfaces 660 (e.g., parallel interface 662, serial interface 664, infrared (IR) interface 666, keyboard interface 668, mouse interface 670, and fixed disk (HDD) 672) coupled to ISA bus 640. Alternatively, many I/O devices can be accommodated by a super I/O controller (not shown) attached to ISA bus 640.

BIOS 680 is coupled to ISA bus 640, and incorporates the necessary processor executable code for a variety of low-level system functions and system boot functions. BIOS 680 can be stored in any computer readable medium, including magnetic storage media, optical storage media, flash memory, random access memory, read only memory, and communications media conveying signals encoding the instructions (e.g., signals from a network). In order to attach computer system 601 to another computer system to copy files over a network, LAN card 630 is coupled to PCI bus 625 and to PCI-to-ISA bridge 635. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of displaying layered data, said method comprising:
selecting one or more objects to be displayed in a plurality of layers;
identifying a plurality of non-spatially distinguishable display attributes, wherein one or more of the non-spatially distinguishable display attributes corresponds to each of the layers;
matching each of the objects to one of the layers;
applying the non-spatially distinguishable display attributes corresponding to the layer for each of the matched objects;
determining a layer order for the plurality of layers, wherein the layer order determines a display emphasis corresponding to the objects from the plurality of objects in the corresponding layers; and
displaying the objects with the applied non-spatially distinguishable display attributes based upon the determination, wherein the objects in a first layer from the plurality of layers are visually distinguished from the objects in the other plurality of layers based upon the non-spatially distinguishable display attributes of the first layer.

2. The method as described in claim 1 further comprising:
receiving a request from a user to rearrange the layers;
rearranging the layers in response to the request, the rearranging including:
re-matching one or more objects to a different layer from the plurality of layers;
applying the non-spatially distinguishable display attributes corresponding to the different layer to the one or more re-matched objects; and
displaying the one or more re-matched objects.

3. The method as described in claim 1 further comprising:
reading the objects from a data store; and
reading one or more object attributes corresponding to each object from the data store,
wherein the matching further comprises:
matching the object attributes corresponding to each object to one or more layer attributes corresponding to each layer.

4. The method as described in claim 1 further comprising:
creating the objects;
setting one or more object attributes corresponding to each object; and
storing the object and the object attributes in a data store.

5. The method as described in claim 4 further comprising:
establishing one or more relationships from at least one of the objects to one or more other objects.

6. The method as described in claim 1 wherein the non-spatially distinguishable display attributes are selected from the group consisting of: color hue, color value, color saturation, size, three dimensional image, animation, shading, fill pattern, line pattern, line weight, opaqueness, transparency, shape, and object anomaly.

7. The method as described in claim 1 further comprising:
displaying one or more relationship lines connecting at least one of the objects to one or more other objects.

8. An information handling system comprising:
one or more processors;
a memory accessible by the processors;
a nonvolatile storage area accessible by the processors;
a display screen accessible by the processors; and
a layered data display tool to display layered data on the display screen, the layered data display tool including:
logic for selecting one or more objects to be displayed in a plurality of layers;
identification logic to identify a plurality of non-spatially distinguishable display attributes, wherein one or more of the non-spatially distinguishable display attributes corresponds to each of the layers;
matching logic for matching each of the objects to one of the layers;
applicator logic to apply the non-spatially distinguishable display attributes corresponding to the layer for each of the matched objects;
determination logic for determining a layer order for the plurality of layers, wherein the layer order determines a display emphasis corresponding to the objects from the plurality of objects in the corresponding layers; and
display control logic to display the objects with the applied non-spatially distinguishable display attributes, wherein the objects in a first layer from the plurality of layers are visually distinguished from the objects in the other plurality of layers based upon the non-spatially distinguishable display attributes of the first layer.

9. The information handling system as described in claim 8 further comprising:
a rearranging request received from a user;
rearranging logic to rearrange the displayed layers, the rearranging logic including:
re-matching logic to re-match one or more objects to a different layer from the plurality of layers;
application logic to apply the non-spatially distinguishable display attributes corresponding to the different layer to the one or more re-matched objects; and
display logic to display the one or more re-matched objects.

10. The information handling system as described in claim 8 wherein the non-spatially distinguishable display attributes are selected from the group consisting of: color hue, color value, color saturation, size, three dimensional image, animation, shading, fill pattern, line pattern, line weight, opaqueness, transparency, shape, and object anomaly.

11. The information handling system as described in claim 8 further comprising:
logic to read the objects from a data store within the nonvolatile storage area; and
logic to read one or more object attributes corresponding to each object from the data store,
wherein the matching logic further comprises:
logic to match the object attributes corresponding to each object to one or more layer attributes corresponding to each layer.

12. A computer program product stored on a computer usable medium for displaying layered data, said computer program product comprising:
  means for selecting one or more objects to be displayed in a plurality of layers;
  means for identifying a plurality of non-spatially distinguishable display attributes, wherein one or more of the non-spatially distinguishable display attributes corresponds to each of the layers;
  means for matching each of the objects to one of the layers;
  means for applying the non-spatially distinguishable display attributes corresponding to the layer for each of the matched objects;
  means for determining a layer order for the plurality of layers, wherein the layer order determines a display emphasis corresponding to the objects from the plurality of objects in the corresponding layers; and
  means for displaying the objects with the applied non-spatially distinguishable display attributes, wherein the objects in a first layer from the plurality of layers are visually distinguished from the objects in the other plurality of layers based upon the non-spatially distinguishable display attributes of the first layer.

13. The computer program product as described in claim 12 further comprising:
  means for receiving a request from a user to rearrange the layers;
  means for rearranging the layers in response to the request, the rearranging including:
  means for re-matching one or more objects to a different layer from the plurality of layers;
  means for applying the non-spatially distinguishable display attributes corresponding to the different layer to the one or more re-matched objects; and
  means for displaying the one or more re-matched objects.

14. The computer program product as described in claim 12 further comprising:
  means for reading the objects from a data store; and
  means for reading one or more object attributes corresponding to each object from the data store,
  wherein the matching further comprises:
    means for matching the object attributes corresponding to each object to one or more layer attributes corresponding to each layer.

15. The computer program product as described in claim 12 further comprising:
  means for creating the objects;
  means for setting one or more object attributes corresponding to each object; and
  means for storing the object and the object attributes in a data store.

16. The computer program product as described in claim 15 further comprising:
  means for establishing one or more relationships from at least one of the objects to one or more other objects.

17. The computer program product as described in claim 12 wherein the non-spatially distinguishable display attributes are selected from the group consisting of: color hue, color value, color saturation, size, three dimensional image, animation, shading, fill pattern, line pattern, line weight, opaqueness, transparency, shape, and object anomaly.

18. The computer program product as described in claim 12 further comprising:
  means for displaying one or more relationship lines connecting at least one of the objects to one or more other objects.

* * * * *

UNITED STATES PATENT AND TRADEMARK OFFICE
CERTIFICATE OF CORRECTION

PATENT NO. : 7,187,389 B2
APPLICATION NO. : 09/833418
DATED : March 6, 2007
INVENTOR(S) : Sarah Redpath, Randy Rendahl and Robert Uthe It is certified that error appears in the above-identified patent and that said Letters Patent is hereby corrected as shown below:

Column 9, Line 21
In Claim 1, replace "non-spatiafly" with -- non-spatially --.

Signed and Sealed this

Twenty-fourth Day of March, 2009

JOHN DOLL
*Acting Director of the United States Patent and Trademark Office*